3,772,234
WAX-HYDROGENATED BLOCK COPOLYMER COMPOSITIONS AND ARTICLES MADE THEREFROM
Lee M. Porter, Pleasant Hill, Calif., assignor to Shell Oil Company, New York, N.Y.
No Drawing. Continuation-in-part of abandoned application Ser. No. 12,853, Feb. 19, 1970. This application June 21, 1971, Ser. No. 155,272
Int. Cl. C08d 13/16; C08f 45/52
U.S. Cl. 260—28.5 B          6 Claims

ABSTRACT OF THE DISCLOSURE

The modification of petroleum waxes with certain hydrogenated block copolymers substantially improves their flexibility and toughness as well as other properties particularly desirable in paper or film coating as well as for lamination purposes and carpet backing.

---

This is a continuation-in-part of U.S. Ser. No. 12,853, filed Feb. 19, 1970, now abandoned.

This invention is concerned with new wax-polymer compositions. More particularly it is directed to petroleum waxes modified with certain hydrogenated block copolymers more fully described hereinafter.

The use of petroleum waxes for the coating of paper or other substrates requires combinations of certain critical properties; these include flexibility, particularly at relatively low temperatures and toughness under a wide variety of conditions in order to minimize or prevent the waxes from flaking from the substrate and allowing cracks to appear in the waxed article. Coatings are particularly required having good low temperature properties where dairy cartons and the like are concerned. Moreover, freezer wraps are of even more demanding requirements relative to tendency to crack under the low temperature conditions encountered. On the other hand, the wax coatings must be of such a character that they do not block, i.e., stick together, at elevated temperatures such as normally encountered during storage or pressure such as may occur in the stacking of sheets of the wax coated substrates or in the stacking of cartons awaiting filling or use.

Waxes have been modified by a great number of polymers in efforts to improve the compositions for the above and other uses. Many of the polymers, however, lack suitable properties and also have been found to be relatively incompatible with the petroleum waxes and therefor tend to form a separate phase therefrom when the compositions are in the melted state, such as in a reservoir of a coating machine. Furthermore, oxidative problems are encountered when the polymers contain olefinic unsaturation. The viscosity requirements of various applicators must be met by any coating composition in order for the particular machine to be operable therewith. Again, many polymers, due either to high molecular weight or incompatibility with wax, form wax products which are too high in melt viscosity at the temperatures normally encountered during the operation of certain specific application mechanisms. Furthermore, for certain use situations, as in carpet backing, it is necessary for the compositions to maintain their integrity even under conditions of shock, bending, sweeping, rolling, and other normal use to which carpets or other substrates may be subjected during their utilization.

It is an object of the present invention to provide improved wax compositions. It is a further object of the invention to provide wax compositions modified by certain hydrogenated block copolymers. It is a particular object of the invention to provide wax compositions suitable for use in curtain coating and other wax applicator machines. It is a further particular object of the invention to provide paper products bearing a surface coating of said wax compositions. Other objects will become apparent during the following detailed description of the invention.

Now, in accordance with the present invention, wax compositions having a variety of improved properties particularly relating to flexibility, toughness, and adhesion to either organic or metallic substrates, comprise petroleum hydrocarbon waxes modified with 5–75% by weight based on the wax-polymer composition of certain block copolymers having at least one saturated aliphatic elastomeric hydrocarbon polymer block B compatible with wax and at least two hydrocarbon polymer blocks A substantially less compatible with the wax. By "compatible" is meant the ability of a polymer of a specific type to form a single phase with a melted wax. By "less compatible" is meant the tendency of a polymer of a specific type to form a separate phase in a melted wax. Again, in accordance with the present invention, articles of commerce coated with the subject wax-hydrogenated block copolymer compositions are provided including cartons, coated wraps, carpets backed with the compositions and other end uses. Curtain coating compositions are provided, which are especially suitable for use in the currently employed curtain coating machines, comprising paraffin waxes containing 10–20% by weight of hydrogenated block copolymers wherein the saturated aliphatic elastomeric hydrocarbon polymer blocks, B substantially compatible with the wax, have average molecular weights in the range 70,000–110,000. Furthermore, it has been found that the greatest improvement in physical properties of the wax-block copolymer blends is obtained when the blocks B comprise ethylene/butene copolymer blocks having between about 13% and about 17% by weight of pendant ethyl substituents.

The present invention is based in part upon the discovery that the non-hydrogenated counterparts of the hydrogenated polymers of this invention tend to be incompatible with the petroleum waxes, particularly in the melted state of the wax composition, and thereby are prone to form a separate phase from the wax phase during the time that the melt may be in a reservoir feeding the composition to the coating machines. Moreover, an unpredictable finding lies in the substantially improved set of physical properties of the blends including flexibility over a wide range of temperatures, elongation, and tensile strength. None of these properties are directly related to the excellent stability of the block polymers having little if any aliphatic unsaturation, as compared with their unsaturated counterparts. These aspects will be illustrated in the working examples given hereinafter.

In accordance with the present invention, it has been found that the wax-hydrogenated block copolymer compositions of this invention form an especially tight bond with paper or other fiberous products, and even with continuous web such as glassine, and the like, as well as with metallic foils such as aluminum foil. In the latter instance, the use of the compositions of this invention as hot melt adhesives for the formation of laminates is especially contemplated. These laminates are useful not only as high strength wraps but also for the preparation of insulation boards or insulation bats and the like.

The compositions of this invention may be utilized in any of the commercially available coating machines such as curtain coaters, extrusion coaters, pattern coaters, and the like. Coating also may be made by dipping if desired. It will be apparent that good homogeneity of the block copolymer with the wax is essential for the successful use of each of these types of operations. The compositions may be adjustaed with respect to viscosity by those experts in the art of the operation of the individual coating machines. For example, curtain coating is normally conducted at temperatures between about 240° F. and 300° F. and usually employs a coating composition having a viscosity at these temperatures between about 200 and 600 centipoises. It has been found especially suitable to utilize relatively low molecular weight block copolymers which have been hydrogenated, all as more particularly described hereinafter, for use in curtain coating.

Extrusion coating employs higher temperatures in the order of 300–400° F. While this permits higher molecular weight polymers to be employed since the viscosity of the wax-polymer will be substantially reduced at these temperatures, it also imposes a stability requirement upon the components of the wax-polymer composition which is usually not met adequately by non-hydrogenated block copolymers or by such polymers as ethylene-vinyl acetate copolymers. Consequently, the present invention yields outstanding extrusion coating in this respect since the block copolymers of the present invention have a sharply reduced olefinic unsaturation in the more compatible block copolymer blocks.

The waxes particularly to be employed in the compositions of this invention are petroleum waxes having paraffins between about 20 and 60 carbon atoms per molecule. The normal paraffin content is higher as the average molecular weight decreases. Petroleum waxes are obtained from waxy crude oil fractions, the relatively lower molecular weight paraffin waxes being obtained from distillate fractions, especially lube oils, while relatively high molecular weight paraffin waxes are separated from residual fractions such as bright stock fractions. The residual waxes include not only paraffin waxes but also microcrystalline waxes, the latter being complex mixtures of branched paraffins and cycloparaffin waxes with only small amounts of aromatics and substantially no straight chain paraffins. The following table shows typical waxes, relating melt points with molecular weights and concentration of normal paraffins in typical fractions containing them.

TABLE 1

| Melting point (° F.) | Approximate Average molecular weight | Carbon atom range | Concentration of n-paraffins (percent v.) |
|---|---|---|---|
| 126 | 350 | $C_{20}-C_{32}$ | 92 |
| 140 | 420 | $C_{22}-C_{33}$ | 80 |
| 160 | 580 | $C_{24}-C_{45}$ | 54 |
| 182 | 650–750 | $C_{30}-C_{60}$ | 10 |
| 138 | 650–750 | $C_{28}-C_{60}$ (microcrystalline) | 12 |

The above and other petroleum waxes, as well as mixtures of such waxes may be modified in accordance with the present invention by 5–75% by weight, (preferably 7.5–30%) based on the weight of the combined wax and polymer, of the hydrogenated block copolymer containing at least one polymer block B which is elastomeric, largely saturated aliphatic and compatible with the wax and at least two polymer blocks A which are essentially less compatible with wax. These block copolymers contain at least three or more polymer blocks, the blocks alternating in types A and B. The usual type of block copolymer has the structure A—B—A. However, this is only the most simple type of three-block copolymer and linear or branched configurations also are included. The linear block copolymers have structures of the general formulation A—B—A—(B—A)$_n$ while the branched configurations may have, among other alternatives, the general structures such as

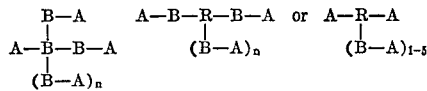

The latter configurations, as well as some linear configurations, may be created by the type of coupling agents which may be employed as one of the alternatives in block copolymer preparation, the other alternative being a sequential process for the block copolymer synthesis. The subscript $n$ has an integer value usually between about 0 and 5. The coupling agent residue is monomeric, is ignored in these general formulae. However, if a polymeric coupling agent such as epoxidized dienes, e.g., epoxidized polybutadiene is used, the symbol R may represent the coupling agent residue. The following description of the types of block copolymers contemplated will be in terms of a three-block copolymer A—B—A, but it will be understood that both linear and branched counterparts thereof are contemplated. Furthermore, it will be understood that coupling agent residues, if any, are ignored for the sake of simplicity in the following description of the block copolymer configurations.

Requirements for compatibility of the block copolymers with the waxes, especially when melts of the compositions are contemplated in their application, are met only when the B block is a substantially saturated aliphatic hydrocarbon block such as one obtains by the hydrogenation of about 50% and preferably at least 80% of the olefinic unsaturation of a conjugated diene polymer block, or one of comparable composition formed by copolymerizing alpha mono-olefins, again the requirement being that the resulting polymer block must be of such a structure and identity that it is relatively miscible with the petroleum waxes and, for the purposes of improving toughness, should be elastomeric. Polyethylene blocks, for example, would not meet these requirements. Thus in alpha olefin blocks, it is necessary to employ a copolymer block, e.g., of ethylene with propylene. With respect to hydrogenated polymer blocks derived from conjugated dienes, the most usual monomers employed for this purpose are butadiene and isoprene or mixtures thereof. If butadiene is employed as the sole conjugated diene monomer for B-block formation, it is necessary to adjust the polymerization conditions to obtain at least 10% and preferably 20–45%, particularly 25–31% 1,2 microstructure in the block in order to impart suitable wax compatibility and elasticity, following hydrogenation. In the specification, when hydrogenated diene polymer blocks are referred to, it should be understood that this is intended to include alpha olefin polymer blocks.

The typical monomers employed for the formation of relatively non-miscible or low miscibility polymer blocks are monovinyl arenes such as styrene, ring alkylated styrene, e.g., tert-butyl styrene, and alpha-methyl styrene.

Hydrogenation is essential for the elastomeric block intended to be miscible with the petroleum waxes unless a mixture of alpha mono-olefins are the monomers predominating in such blocks. The hydrogenation of the polymer blocks A generally having reduced miscibility with the paraffin waxes is not essential but may be employed in certain instances. Again, the hydrogenation may be either partial or complete.

Typical three-block polymers of which there are multi-block counterparts may have the following configurations:

polystyrene-[hydrogenated polybutadiene] [1]-polystyrene;
hydrogenated polystyrene-[hydrogenated polybutadiene] [1]-hydrogenated polystyrene;
polystyrene-[hydrogenated polyisoprene]-polystyrene;
polystyrene-[hydrogenated polyisoprene]-polystyrene;
hydrogenated polystyrene-[hydrogenated polyisoprene]-hydrogenated polystyrene;
poly(alpha methyl styrene)-[hydrogenated polyisoprene]-polystyrene.

One advantage of the present invention lies in the possibility of synthesizing the block polymers in situ, i.e. in melted wax if so desired. Another advantage is that wax can be blended into a polymerization reaction mixture containing a relatively volatile inert solvent which may be removed if required prior to utilization of the wax-hydrogenated block polymer composition. On the

[1] At least about 10% 1,2-microstructure in the precursor.

other hand, the block copolymers may be separately prepared and hydrogenated and later added to the waxes. The block copolymers are normally synthesized by use of such initiators as lithium alkyls or other organo lithium initiators such as dilithonaphthalene and the like. The processes employed may be either sequential or involve coupling as referred to hereinbefore. The details of polymer synthesis do not form a part of the present invention. Sequential processes or the use of a mixed sequential and binary coupling process such as with a dihalohydrocarbon or monoesters, ketones, etc., will result in the formation of linear block copolymer, while the use of multi-functional coupling agents such as esters of monohydric alcohols with dibasic acids, e.g., diethyl adipate will result in branched coupled products which are predominately tetramers of the precursor mixed with a minor amount of trimers. In the latter case, for example, polystyrene is first polymerized and then block polymerized with isoprene to form an intermediate block copolymer polystyrene-polyisoprene-Li which is then subjected to a coupling reaction such as with dihaloalkane or with a polyfunctional coupling agent such as silicon tetrachloride or the above described class of diesters. Such polyfunctional coupling agents result in branched block polymer configuration.

The molecular weights of the block copolymers is best described with respect to the individual blocks. While this will vary with the specific wax to be modified, the method and apparatus employed, and with the temperature of application of the wax polymer compositions, as well as with the monomer identity, the block molecular weights especially contemplated are as follows: It is preferred that the blocks B have average molecular weights between about 25,000 and 200,000. Still more preferably, the blocks A are restricted to molecular weights averaging 7,500–50,000 while blocks B are restricted to average molecular weights between about 30,000–150,000.

As referred to briefly hereinbefore, one of the important uses of the present compositions lies in their application to substrates by the curtain coating process. This process is widely used commercially for coating corrugated board, paper and the like. The apparatus employed consists essentially of a heated reservoir for the coating composition, pumps, filters, die head and associated components. Hot melt material is pumped to the die head, usually through a filter. The die head has an adjustable slot opening from which the hot melt material falls as a curtain to contact the substrate being passed on a moving belt or being advanced by other means.

A critical limitation is imposed by these widely used machines with respect to the viscosity range of the hot melts operable therein. This range has been established as 200–600 centipoises at the application temperature (usually 250–350° F.). Thus any wax-polymer compositions must meet this critical viscosity limitation if they are to be accepted by the paper converting industry, since alteration of the existing coating equipment to handle compositions having other viscosities is costly and impractical.

As working examples given hereinafter show, a critically limited set of block copolymers have been found which, when combined with wax, not only meet the viscosity limitation requirements of the curtain coating machines, but also provide outstanding results when coated on substrates by this (or other) equipment. These compositions comprise a major amount of a paraffin and/or microcrystalline hydrocarbon petroleum wax and a minor amount (preferably 8–15% by weight of the total composition of a special block copolymer having the following set of characteristics:

(a) A block copolymer having at least one essentially saturated hydrogenated polybutadiene polymer block having 25–31% (preferably 26–30%) 1,2 content in the precursor, the average molecular weight of the block being between about 75,000 and about 100,000.

(b) At least two alpha-alkenyl arene polymer blocks, each having an average molecular weight between about 6,500 and about 9,500.

It will be understood that the saturated polybutadiene block may be referred to as an ethylene/butene copolymer block as long as the latter meets the same ethyl side-chain limitation, i.e., 13% to 17% (by weight) of ethyl side chains. Furthermore, it will be understood that block copolymers falling within the broader description given hereinbefore are useful for wax modification, but unless such blends meet the curtain coating machine viscosity limitations they would be applied with other equipment.

One aspect of the present invention comprises the unexpected elongations which can be obtained with the described compositions. Moreover, the coatings applied to paper have exhibited outstanding resistance to cracking upon repeated folding at freezing temperatures as well as room temperatures, one of the standard tests applied to coated paper stocks.

The properties of these compositions indicate their particular utility for paper coatings, film coatings, laminating adhesives, and other applications of hot melt adhesive compositions as well as in wood impregnation. In the latter instance, wood is often impregnated with preservatives such as cresol and the like and wax is added to the cresol for the primary purpose of increasing penetration and reducing evaporation. The addition of the hydrogenated block copolymers within the limits described hereinbefore to the wax component causes a substantial reduction in evaporation of cresol and other volatiles from impregnated wood. The compositions may be modified by the presence of other polymers, particularly 3–20% by weight of saturated hydrocarbon resins such as resins derived from cracked petroleum fractions and resins of saturated terpene derivatives derived from wood rosin. Other examples are ethylene ethylacrylate and ethylene methylmethacrylate copolymers. They may be extended with rubber extending oils to form softer compositions if desired and may be employed in rug backing for the purpose of fiber locking and water proofing of other textiles.

The following examples illustrate the properties obtained with the compositions of this invention.

EXAMPLE I

A block copolymer of styrene and isoprene was made by polymerizing styrene in cyclohexane solution using lithium secondary butyl catalyst to form a first polymer block having an average molecular weight of about 15,000, following which isoprene was introduced and polymerization continued to form a polyisoprene block having an average molecular weight of about 36,000, the intermediate block copolymer being associated with the lithium ion at the growing end of the copolymer chain. At this point the copolymer was coupled using dimethyl adipate as the coupling agent, resulting in a tetramer of the intermediate block copolymer having a branched configuration. This coupled block copolymer was then hydrogenated selectively using as the hydrogenation catalyst the reaction product of aluminum triethyl with nickel octoate under relatively mild hydrogenation conditions such that only the polyisoprene blocks were hydrogenated. A 20% solution of the hydrogenated block copolymer was readily formed by stirring with molten petroleum wax, the wax comprising a mixture of 30 parts by weight of paraffin wax having a melting point of 140° F., 10 parts by weight of paraffin wax having a melting point of 160° F., 15 parts by weight of paraffin wax having a melting point of about 182° F. and about 15 parts by weight of microcrystalline wax having a softening point of about 138° F. The composition withstands 1,000 folds in the MIT folding test without breaking, had a strong stiff melt up to 1,000% elongation, the percent of elongation at break being 1,165%, 300% modulus of 195 p.s.i., and a room temperature tensile of 660 p.s.i. These properties indicate its use in applictions where the thick films are needed such as in carpet backing or related utility.

EXAMPLE II

A sequentially polymerized block copolymer was formed wherein the original monomers were styrene and butadiene having the structure polystyrene-polybutadiene-polystyrene. The polystyrene blocks had an average molecular weight of 10,000. A sufficient amount of diethyl ether was added during the polymerization of the butadiene block to result in a 28% 1,2 addition structure in that block. The butadiene block had a molecular weight of about 30,000. Hydrogenation was conducted under conditions causing essentially complete hydrogenation of all blocks, utilizing the same catalyst as described in Example I but employing higher hydrogenation temperatures and pressures. A 20% solution of the resulting hydrogenated block copolymer in the same wax mixture described in Example I was readily formed. This blend had a viscosity at 300° F. of 330 centipoises, which is in the middle of the desired range for curtain coating operations. Coatings on sulfite paper could not be removed without tearing the paper. In MIT folding tests without aging, the blend passed 257–318 folds. After one day again, the blend passed 303–305 folds.

The MIT folding test uses a pressed specimen 50 mils thick, 15 mm. wide and 4 inches long. The sample is aged for a minimum of 24 hours at 73° F. under 50% relative humidity. It is subjected to double flexes of 135° in each direction, 175 times per minute with a ½ pound load on the specimen.

EXAMPLE III

The block copolymer described in Example II was dispersed in a wax blend comprising 5 parts by weight of a paraffin wax having a melting point of 140° F., 3 parts by weight of microcrystalline wax, and 2 parts by weight of paraffin wax having a melting point of 182° F. and applied to corrugated paper board, using an Egan curtain coater. A board speed of 650 feet per minute was employed to form coatings weighing 7 pounds per 1,000 square feet. The table below gives the properties of the products so prepared.

TABLE II

| Percent polymer in blend | ° F. temp. of wax curtain as it hits board | 73° F. flex [1] | 34° F. flex [2] | Visc. at 300° F., cp. | Gradient block test, ° F. | | | MIT folds |
|---|---|---|---|---|---|---|---|---|
| | | | | | Slight | Moderate | Fiber tear | |
| 20 | 290 | 0.5 | 2-3 | 360 | 122 | >140 | >140 | 240 |
| 18 | 280 | 0.5 | 3 | 236 | 121 | >140 | >140 | 104 |
| 16 | 280 | 0.6 | 4-5 | 152 | 122 | >140 | >140 | 50 |
| 14 | 270 | 1.1 | 5-6 | 116 | 122 | >140 | >140 | 18 |
| 12 | 270 | 5.4 | >6 | 88 | 123 | >140 | >140 | 0 |
| 10 | 270 | >30.0 | >6 | 70 | 122 | >140 | >140 | 0 |

[1] Number of dye stains per foot on a 180° crease.
[2] Olin-Kraft rating of a 7 inch specimen:

| Rating: | Number of stains |
|---|---|
| 1 | 0-5 |
| 2 | 7-10 |
| 3 | 11-15 |
| 4 | 16-20 |
| 5 | 21-25 |
| 6 | 26-30 |

EXAMPLE IV

The polymer-wax composition of Example II was duplicated with the exception that the polymer employed was hydrognated under milder conditions thus hydrogenating only the center block. Coatings could not be removed from sulfite paper without tearing the fibers and had an aluminum foil adhesion of 100–125 grams per inch. A similar composition containing only 10% of the polymer when coated on paper and aluminum foil showed the same paper tear test result and had an aluminum foil adhesion of 65–68 grams per square inch.

EXAMPLE V

A block copolymer was formed as described in Example II except that block molecular weights were 15,000–68,000–13,500, the center block having 40% 1,2 content. Hydrogenation was carried to the extent of completely saturating the polybutadiene blocks but saturating only one-half of the aromatic linkages of the polystyrene blocks. Compositions were made with the same wax described in Example I, 20 and 10% of the polymer, respectively, being used in two samples. The composition was coated on paper, glassine, and aluminum foil. It could not be removed from either paper or glassine without tearing them. The adhesion to aluminum foil of the 20% sample was 175–225 grams per square inch, while the adhesion of the 10% sample to aluminum foil was 100–160 grams per square inch.

EXAMPLE VI

An attempt was made to compound a non-hydrogenated block copolymer (polystyrene-polybutadiene-polystyrene) with paraffin wax. Compound was difficult, even in a wax melt, and on cooling to room temperature there was evidence of phase separation of the polymer from wax. The physical properties of the compositions were unsatisfactory.

Aqueous emulsions of the wax-polymer compositions may be made. Such emulsions may be employed for coating, dipping, impregnation, or in oil well treating, such as fracturing fluids. The wax-oil particles may act as temporary propping agents or blocking agents in such a use.

EXAMPLE VII

The properties of a wax-block copolymer blend can be dramatically improved by the addition of a hydrogenated aliphatic-type petroleum resin. The block copolymer was the fully hydrogenated species having the structure, before hydrogenation, of polystyrene-polybutadiene (40% 1,2)-polystyrene. The block molecular weights were 15,000–68,000–14,000. The wax employed was the same as that shown in Example I. The resin was a thermoplastic hydrocarbon resin, derived from the high temperature cracking of petroleum. Raw material is a mixture of monomers having an approximate average molecular weight of 90 and composed essentially of dienes and reactive olefins. These resins are unique because they are a mixture of straight chain hydrocarbon resins in which considerable cyclic, but not aromatic structures are present.

The properties of resin were as follows:

Softening point, ° C. _____ 97–103
Average weight _____ 1,400
Iodine number _____ 60

The data in the table below show that elongation and MIT flex rating are dramatically improved by adding an equal percentage of resin even though the composition of only wax and resin has zero flex strength. Also, qualitative observation of the surface of wax blend coated onto corrugated board shows the gloss to be improved.

| Blend composition | Viscosity at 300° F., cps. | MIT | Tensile properties | | |
|---|---|---|---|---|---|
| | | | Yield pt., p.s.i. | Tb, p.s.i. | EB, percent |
| 10% block polymer<br>90% wax | 261 | 1 | 495 | 400 | 80 |
| 10% block polymer<br>10% resin<br>80% wax | 307 | 487 | 550 | 400 | 180 |
| 10% resin<br>90% wax | 20 | 0 | | 520 | 0 |

EXAMPLE VIII

In order to determine the difference between wax compositions containing non-hydrogenated polymers and hydrogenated polymers, the following series of comparative tests were performed. The three polymers utilized for this purpose were as follows:

(a) Polystyrene-polybutadiene-polystyrene, block molecular weights 10,000–30,000–10,000. The polybutadiene block had 28% 1,2 content.

(b) A partially hydrogenated derivative of block polymer A in which the polybutadiene block was essentially hydrogenated to an ethylene/butene copolymer block having the same degree of branching.

(c) The fully hydrogenated derivative of block copolymer A in which all of the polymer blocks were substantially saturated. Three blends containing 20% of the individual block copolymers were prepared in a petroleum paraffin wax. Each blend was stirred at 150° C. and 80 r.p.m. until a clear homogeneous solution was obtained. Table I below lists the time required for this purpose.

TABLE I

Polymer: Time to dissolve (hours)
a ---------------------------------------- 18.5
b ---------------------------------------- 1.25
c ---------------------------------------- 1.25

The above results indicate clearly that the non-hydrogenated block copolymer had very poor compatibility with petroleum paraffin wax while the two hydrogenated polymers were highly compatible therewith.

The solutions formed at 150° C. were cooled until a definite evidence was exhibited of phase separation between a polymer phase and a wax phase. Table II below shows the temperature at which phase separation occurred.

TABLE II

Polymer: Phase separation temperature (° C.)
a ---------------------------------------- 140
b ---------------------------------------- 70
c ---------------------------------------- 70

The above results indicate that the non-hydrogenated polymer (a) was indeed highly incompatible with paraffin wax as indicated by its relatively high phase separation temperature as contrasted to the substantially lower phase separation temperatures of the hydrogenated polymers.

Physical properties of the blends were performed, namely, flexibility, tensile strength and elongation. Table III presents the data so obtained.

TABLE III

| | Flexibility | Tensile at break (p.s.i.) | Elongation at break, percent |
|---|---|---|---|
| Polymer: | | | |
| a | 0–1 | 520 | 0 |
| b | 688 | 805 | 200 |
| c | 240 | 795 | 100 |

The flexibility was tested by the Standard MIT Folding Endurance Test referred to in Example I and II and fully described in ASTM D-2176–69.

The above data prove clearly that the hydrogenated block copolymers exhibit unexpected and unpredictable improvements in the physical properties of waxes. Since these tests, the results of which are given in Table III, are not dependent upon the stability of several polymers tested, it is self-evident that the physical properties are dependent upon the relationship of the specific block copolymers to the wax particularly with respect to compatibility of the hydrogenated diene polymer blocks.

EXAMPLE IX

Hydrogenated block molecular weight effect

Curtain coating compositions were prepared containing a series of block copolymers having the structure polystyrene-hydrogenated polybutadiene-polystyrene in which the polystyrene blocks all had between 6900–8900 molecular weight. The now hydrogenated polybutadiene block had 28%, 1,2 content. The molecular weights were varied in the latter block and dispersed in the same wax utilized in the preceding Examples I and II in various concentrations. The table below summarizes the results of these comparative tests.

TABLE IV

| | Block, mol. wt. ×10⁻³ | Percent conc. for 200–500 cp. at 300° F. | 73° F. flex | 34° F. flex | Grease resistance |
|---|---|---|---|---|---|
| Polymer: | | | | | |
| A | 7.8–47–8.6 | 11.5–14.5 | OK at 12% | OK at 11% | OK. |
| B | 8.5–89–8.9 | 8.8–11.2 | OK at 9% | OK at 10% | Best. |
| C | 8.9–147–6.9 | 5.0–6.5 | OK at 7% | OK at 12% | OK. |

The above compositions were coated on corrugated board stock using a curtain coater at about 300° F. It will be noted from the data that relative to polymers B and C an excessive amount of polymer A is required in order to bring the composition within the curtain coater viscosity range. Moreover, one third more of polymer A was required than of polymer B to provide a satisfactory 73° F. flex rating.

The high molecular weight of the center block of polymer C restricted the amount of polymer which could be employed in the satisfactory 73° F. flex was not obtained with wax blends of polymer C until an amount of polymer C was present which exceeded the amount permitted on the viscosity basis. Thus, the only polymer satisfactory of the three tested was polymer B, having a hydrogenated polybutadiene block of 89,000 average molecular weight.

EXAMPLE X

A block copolymer having the structure: polystyrene-polybutadiene (28% 1,2)-polystyrene was prepared having block molecular weights (by tritium counting method) of 10,000–30,000–10,000. One portion of the copolymer sample was selectively hydrogenated to saturate only the polybutadiene block. A second portion of the sample was completely hydrogenated. Using the wax described in Example I and tested for flexibility by the MIT folding test described in Example II, the following data show the superiority of the wax compositions containing the selectively hydrogenated polymer:

Selectively hydrogenated polymer— (polystyrene-hydrogenated polybutadiene-polystyrene), percent — Flexibility (MIT) (fold endurance)
12 ---------------------------------------- 16
16 ---------------------------------------- 100
20 ---------------------------------------- 688

Completely hydrogenated polymer—
(hydrogenated polystyrene-hydrogenated polybutadiene-hydrogenated polystyrene), percent:

| | |
|---|---|
| 12 | 0 |
| 16 | 50 |
| 20 | 240 |

EXAMPLE XI

In order to demonstrate the superiority of microstructures coming within the preferred scope of the present invention, two polymers were prepared having the structure: polystyrene-polybutadiene-polystyrene, the block molecular weights being 10,000–50,000–10,000. One sample (A) had 28% 1,2 microstructure in the polybutadiene block, while the second sample (B) had a 1,2 microstructure of 40%. The two samples were selectively hydrogenated to saturate only the polybutadiene blocks and then were blended with the same wax described in Example I to form blends containing 10% polymer. Specimens of these blends were then tested by the MIT folding endurance test described in Example II. Sample A survived 112 folds, while sample B failed after only 50 folds.

I claim as my invention:

1. A petroleum wax composition comprising:
    (a) A petroleum wax predominating in paraffin wax; and
    (b) 7.5–30% by weight based on the composition, of a block copolymer having at least one essentially completely hydrogenated polybutadiene block, the block prior to hydrogenation having a 1,2-content of 25–31%, said block having an average molecular weight of 30,000–150,000; and at least two monoalkenylarene polymer blocks having an average molecular weight between 5,000 and 15,000.

2. An article comprising a paper product bearing as a surface coating a composition according to claim 1.

3. A composition according to claim 1 containing in addition 3–40% by weight of saturated petroleum hydrocarbon resin.

4. A composition according to claim 1 wherein the arene is styrene.

5. A composition according to claim 1 comprising a major proportion of paraffin wax and 8–15% by weight of a block copolymer having at least one hydrogenated polybutadiene block and at least two polystyrene blocks, said hydrogenated polybutadiene being characterized by having prior to hydrogenation between about 26 and 30% 1,2 microstructure and by having an average molecular weight between about 30,000 and about 100,000 and each polystyrene block having an average molecular weight between about 6,500 and about 9,500.

6. An article of manufacture comprising a substrate bearing a coating of the composition according to claim 1, said composition having a viscosity of 200–600 cp. at 300° F.

References Cited

UNITED STATES PATENTS

| | | | |
|---|---|---|---|
| 3,231,635 | 1/1966 | Holden et al. | 260—880 B |
| 3,265,765 | 8/1966 | Holden et al. | 260—876 |
| 3,243,396 | 3/1966 | Hammer et al. | 260—28.5 A |
| RE. 27,145 | 6/1971 | Jones | 260—880 B |
| 3,281,267 | 8/1966 | Rice | 117—155 |
| 3,441,530 | 4/1969 | Bauer et al. | 260—876 B |

FOREIGN PATENTS

| | | | |
|---|---|---|---|
| 740,027 | 8/1966 | Canada | 260—28.5 AS |

MORRIS LIEBMAN, Primary Examiner

S. L. FOX, Assistant Examiner

U.S. Cl. X.R.

260—28.5 A; 117—155 R